United States Patent [19]

Kanamori

[11] Patent Number: 5,570,229
[45] Date of Patent: Oct. 29, 1996

[54] REAL IMAGE MODE VARIABLE MAGNIFICATION FINDER OPTICAL SYSTEM

[75] Inventor: Tatsuru Kanamori, Hannou, Japan

[73] Assignee: Olympus Optical Co., Ltd., Tokyo, Japan

[21] Appl. No.: 260,407

[22] Filed: Jun. 14, 1994

[30] Foreign Application Priority Data

Jun. 16, 1993 [JP] Japan .................................. 5-144924

[51] Int. Cl.⁶ .......................... G02B 23/00; G03B 13/08
[52] U.S. Cl. .................... 359/431; 359/421; 359/422; 396/379; 396/386
[58] Field of Search .................... 359/362, 421, 359/433, 835; 354/219–225

[56] References Cited

U.S. PATENT DOCUMENTS

| | | | |
|---|---|---|---|
| 3,658,411 | 4/1972 | Price | 359/686 |
| 4,906,078 | 3/1990 | Inabata et al. | 359/422 |
| 5,311,355 | 5/1994 | Kato | 359/432 |
| 5,491,328 | 2/1996 | Takato et al. | 359/835 |

FOREIGN PATENT DOCUMENTS

| | | |
|---|---|---|
| 337067 | 5/1958 | Japan . |
| 486733 | 3/1992 | Japan . |
| 4219711 | 8/1992 | Japan . |

OTHER PUBLICATIONS

English Abstract of Mukai et al Japanese laid open Application No. 3-287216, Dec, 1991.

*Primary Examiner*—Thong Nguyen
*Attorney, Agent, or Firm*—Cushman, Darby & Cushman

[57] ABSTRACT

A real image mode variable magnification finder optical system is provided with an objective lens having a positive refracting power and an eyepiece having a positive refracting power. The objective lens includes the first lens unit having a negative refracting power, the second lens unit having a positive refracting power which is movable for varying magnification, and the third lens unit having a positive refracting power which is movable for varying magnification. Moreover, the objective lens has the first reflecting surface for erecting an image on the entrance side of the region of a space provided on the object side of the second lens unit to move lenses when a change of magnification is made, and the second reflecting surface for erecting the image between the third lens unit and an intermediate imaging plane. Thus, the finder optical system brings about a reduction of thickness of a camera body, favorable correction for aberration, and cost reduction.

9 Claims, 6 Drawing Sheets

FIG. 5A
SPHERICAL ABERRATION
D=4mm

-1.0   1.0

FIG. 5B
ASTIGMATISM
ω=24.3°

-1.0   1.0

FIG. 5C
DISTORTION
ω=24.3°

-10.   10.

FIG. 6A
SPHERICAL ABERRATION
D=4mm

-1.0   1.0

FIG. 6B
ASTIGMATISM
ω=15.4°

-1.0   1.0

FIG. 6C
DISTORTION
ω=15.4°

-10.   10.

FIG. 7A
SPHERICAL ABERRATION
D=4mm

-1.0   1.0

FIG. 7B
ASTIGMATISM
ω=9.2°

-1.0   1.0

FIG. 7C
DISTORTION
ω=9.2°

-10.   10.

FIG. 8A
SPHERICAL ABERRATION
D = 4 mm

-1.0   1.0

FIG. 8B
ASTIGMATISM
ω = 25.8°

-1.0   1.0

FIG. 8C
DISTORTION
ω = 25.8°

-10.   10.

FIG. 9A
SPHERICAL ABERRATION
D = 4 mm

-1.0   1.0

FIG. 9B
ASTIGMATISM
ω = 16.5°

-1.0   1.0

FIG. 9C
DISTORTION
ω = 16.5°

-10.   10.

FIG. 10A
SPHERICAL ABERRATION
D = 4 mm

-1.0   1.0

FIG. 10B
ASTIGMATISM
ω = 9.7°

-1.0   1.0

FIG. 10C
DISTORTION
ω = 9.7°

-10.   10.

FIG. 11A
SPHERICAL
ABERRATION
D=4mm

-1.0  1.0

FIG. 11B
ASTIGMATISM
ω = 25.8°

-1.0  1.0

FIG. 11C
DISTORTION
ω = 25.8°

-10.  10.

FIG. 12A
SPHERICAL
ABERRATION
D=4mm

-1.0  1.0

FIG. 12B
ASTIGMATISM
ω = 16.3°

-1.0  1.0

FIG. 12C
DISTORTION
ω = 16.3°

-10.  10.

FIG. 13A
SPHERICAL
ABERRATION
D=4mm

-1.0  1.0

FIG. 13B
ASTIGMATISM
ω = 9.6°

-1.0  1.0

FIG. 13C
DISTORTION
ω = 9.6°

-10.  10.

REAL IMAGE MODE VARIABLE MAGNIFICATION FINDER OPTICAL SYSTEM

BACKGROUND OF THE INVENTION

1. Field of the Invention

This invention relates to a real image mode variable magnification finder optical system for use in photographic cameras or video cameras and, more specifically, in cameras whose bodies are small in thickness.

2. Description of the Related Art

Reversed Galilean finder optical systems and Keplerian finder optical systems are well known as conventional finder optical systems in which a photographic optical system is provided independent of a finder optical system. The reversed Galilean finder optical system has defects in that the view of a field frame is unclear and the visual field is blurred by ghosts and flares attributable to a half-silvered mirror disposed to form the field frame. Furthermore, where the optical system is constructed as a variable magnification optical system in particular, its overall length and outside diameter are both increased, and a variable magnification ratio cannot be improved. In contrast to this, the Keplerian finder optical system is adapted to observe a real image formed by an objective lens through an eyepiece, and thus overcomes the problem of blurring the visual field for observation caused by the reversed Galilean finder optical system.

Where the Keplerian finder optical system is provided with the function of varying magnification, it is small in size and high in variable magnification ratio compared with the reversed Galilean finder optical system. Hence, the variable magnification finder optical systems have found many applications in the Keplerian finder optical systems. An example of such optical systems is set forth in Japanese Patent Preliminary Publication No. Hei 4-219711. This optical system is such that a variable magnification objective optical system is composed of a first lens unit with a negative refracting power, a second lens unit with a positive refracting power, and a third lens unit with a positive refracting power, and a first reflecting surface for erecting an image is disposed between the third lens unit and an intermediate imaging plane. Hence, the overall length of the finder in a direction along the optical axis of incidence on the finder optical system (which is hereinafter referred to as a longitudinal length) is practically determined by the length of the variable magnification objective lens. This gives rise to the drawback that the thickness of the camera body cannot be made smaller than the length of the variable magnification objective lens. Further, in order to reduce the longitudinal length in the arrangement mentioned above, it is necessary to increase the refracting powers of individual lens units and reduce the length of the objective lens. The increase of the refracting powers of individual lens units, however, will cause the problems that distortion and other aberrations are deteriorated, the influence of errors on the optical system is increased, and lenses are difficult to make.

Thus, the methods of compactly incorporating a finder optical system in the camera body to decrease the thickness of the camera body are known from optical systems disclosed by Japanese Utility Model Publication No. Sho 33-7067 and Japanese Patent Preliminary Publication No. Hei 3-287216.

In the former optical system, however, a prism having the first reflecting surface for erecting an image is disposed in front of a variable magnification objective lens. For this reason, where the exit pupil is provided in the finder optical system, the prism must be enlarged in order to ensure a beam of light required for the finder optical system. Moreover, since a path-splitting prism for a rangefinder is situated ahead of the above prism, the finder optical system must be disposed adjacent to the backside of the camera body. This makes it impossible to reduce the longitudinal length of the finder optical system and attain the smallest possible thickness of the camera body. Further, besides the fact that the second reflecting surface for erecting the image is situated behind an intermediate imaging plane, the above prism is made large-sized, and hence it is also impossible to reduce the entire length of the finder optical system in a direction perpendicular to the optical axis of incidence thereon (which is hereinafter referred to as a lateral length).

In the latter optical system, on the other hand, the first reflecting surface for erecting the image is situated between two moving lens units, and thus it is necessary to separately move the first and second lens units in directions at right angles to each other. Consequently, the optical system has the problem that a mechanism for moving lenses becomes complicated.

SUMMARY OF THE INVENTION

It is, therefore, an object of the present invention to provide a real image mode variable magnification finder optical system in which its length, notably the longitudinal length, can be reduced, aberrations are favorably corrected, and manufacturing costs are low.

In order to accomplish this object, the real image mode variable magnification finder optical system according to the present invention includes, in the order from the object side, an objective lens with a positive refracting power and an eyepiece with a positive refracting power. The objective lens comprises a first lens unit having a negative refracting power; a second lens unit which can be moved to vary magnification, having a positive refracting power; and a third lens unit which can be moved to vary magnification, having a positive refracting power. Furthermore, a first reflecting surface for erecting an image is disposed on the entrance side of the region of a space provided on the object side of the second lens unit to move lenses when a change of magnification is made, and a second reflecting surface for erecting the image is situated between the third lens unit and an intermediate imaging plane.

Hence, in the present invention, the placement of the first reflecting surface for erecting the image on the entrance side of the region of the space mentioned above (hereinafter referred to as a lens moving space) makes it possible to diminish the longitudinal length of the finder optical system. Specifically, if the first reflecting surface were disposed subsequent to the lens moving space, the longitudinal length of the finder optical system could not be reduced because, at least, the length of the lens units lying on the entrance side of the first reflecting surface and the moving space of the lens units required for varying magnification constitute the longitudinal length of the finder optical system. Additionally, since it is required to move the lens units in different directions (for example, directions at right angles to each other) when a change of magnification is made, a mechanism for moving the lens units will be complicated. Alternatively, in an arrangement subsequent to the first reflecting surface, the entire optical system after being bent at right angles to the optical axis of incidence on the finder is moved in a direction along the thickness of the camera body, with a resultant large space required for the finder optical system.

For compactness of the finder optical system, it is desirable to satisfy the condition $$0.2 < X/\Sigma d_{23} < 0.8 \quad (1)$$

where X is a distance measured along the optical axis from the foremost end of the first lens unit to the intersection of the principal ray at the maximum field angle with the optical axis and $\Sigma d_{23}$ is a length measured along the optical axis from the foremost end of the first lens unit to the rearmost end of the second lens unit.

If the value of Eq. (1) passes the lower limit, the height of a ray incident on the second lens unit will increase, the outside diameter of the second lens unit will enlarge, and the deterioration of coma at the second lens unit will be difficult to correct. This situation leads to degradation of imaging performance. If, on the other hand, the value of Eq. (1) exceeds the upper limit, the height of a ray incident on the first lens unit will increase, the outside diameter of the first lens unit will enlarge, and the deterioration of off-axis aberrations at the first lens unit will be difficult to correct. Consequently, the fluctuation of distortion becomes great and the degradation of imaging performance is caused.

It is favorable that the first reflecting surface is situated inside the first lens unit. As a consequence of this, it is possible to make the longitudinal length of the finder optical system approach the sum of the maximum outside diameter of the finder optical system and the thickness of the eyepiece. The longitudinal length of the finder optical system can thus be materially reduced. In this case, it is favorable to satisfy the condition $$0.1 < \phi_{r1}/\phi_{G1} < 0.7 \quad (2)$$

where $\phi_{r1}$ is a refracting power on the entrance side of the first reflecting surface and $\phi_{G1}$ is the refracting power of the first lens unit.

If the value of Eq. (2) passes the lower limit, the refracting power on the entrance side of the first reflecting surface becomes essentially zero, and the ability to correct aberrations on the entrance side of the first reflecting surface will be practically lost. The result is that the deterioration of aberrations at the first lens unit cannot be corrected. Beyond the upper limit, an axial ray will be considerably raised on the entrance side of the first reflecting surface at a high magnification, causing an increase of the optical path length required for the member with the first reflecting surface. Hence, the height of the axial ray at the second lens unit will increase, the outside diameter of the second lens unit will enlarge, and the deterioration of spherical aberration at the second lens unit will be difficult to correct. Consequently, imaging performance is degraded.

DETAILED DESCRIPTION OF THE PREFERRED EMBODIMENTS

Figure 1:
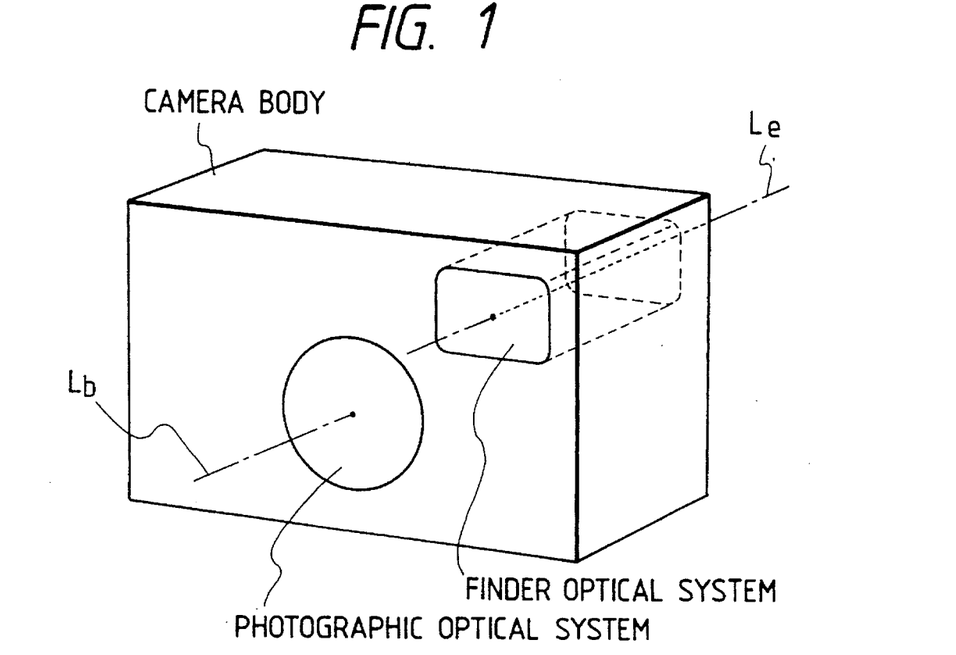
FIG. 1 is a perspective view showing a compact camera in which a real image mode variable magnification finder optical system according to the present invention is provided independent of a photographic optical system.
Figure 2:
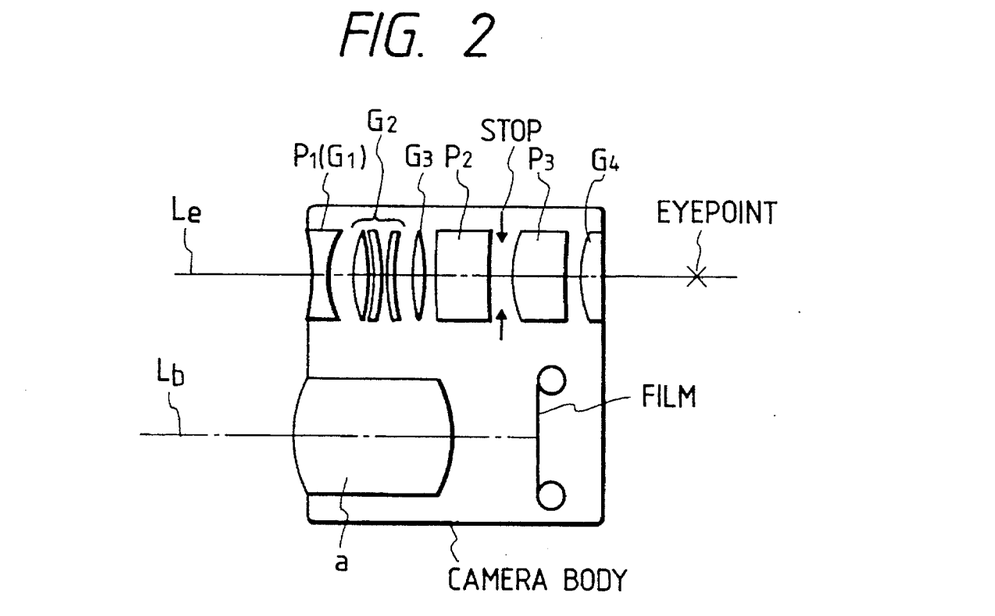
FIG. 2 is a sectional view of the camera shown in FIG. 1.

The real image mode variable magnification finder optical system according to the present invention is used as a finder optical system for a compact camera constructed, for example, as shown in FIGS. 1 and 2. In these figures, reference symbol $L_b$ designates a photographic optical path and $L_e$ designates a finder optical path. Both optical paths are arranged parallel to each other. An object image is observed through a finder comprising a reflecting member $P_1$ which is a first lens unit $G_1$ fixed, including a first reflecting surface, not shown, and composed of a negative lens; a second lens unit $G_2$; a third lens unit $G_3$; a reflecting member $P_2$ including a second reflecting surface, not shown; a stop for making an imaging plane (intermediate imaging plane) coincide with the exit surface of the reflecting member $P_2$, disposed adjacent thereto; a reflecting member $P_3$ including third and fourth reflecting surfaces, not shown; and an eyepiece $G_4$. The object image is formed on a film by a photographic objective lens a. It is favorable that the first reflecting surface is constructed integral with the first lens unit so that the first lens unit is configured as a single negative lens having a prismatic shape. This results in further compactness of the finder optical system and low cost in the manufacturing process. Alternatively, it is needless to say that the first lens unit may well be configured as a plural and the first reflecting surface may well be disposed behind the first lens unit.

The first reflecting surface is disposed on the entrance side of the region of a space provided on the entrance side of the second lens unit for a lens movement in changing magnification. Moreover, the lens moving space required for changing magnification is taken up in a lateral or vertical direction which has rather relatively large space than in a direction along the thickness of the camera body. In this way, the lens moving space in changing magnification can be sufficiently secured, and a high variable magnification ratio is obtained.

For compact design of the camera body, it is also desirable that the optical system has the smallest possible lateral length. In order to keep the lateral length to a minimum, the second reflecting surface for erecting an image should be disposed between the third lens unit and the intermediate imaging plane. Thus, the length of the objective lens subsequent to the first reflecting surface can be reduced, and the lateral length of the finder optical system can also be reduced.

In order to provide the second reflecting surface for erecting an image between the third lens unit and the intermediate imaging plane, it is desirable, at a nearly moderate magnification, to satisfy a condition $$|\mu 23|=1$$

where $\mu 23$ is a combined magnification of the second and third lens units.

Consequently, at the low magnification, the spacing between the second lens unit and the third lens unit is reduced and a complete back focus is ensured, while at the high magnification, the third lens unit is moved toward the entrance side from the position at the low magnification and a complete back focus is also ensured. In this way, at least, the second reflecting surface for erecting an image can be disposed between the third lens unit and the intermediate imaging plane, and the lateral length of the finder optical system can be diminished. Furthermore, the use of at least one aspherical surface in each of the first, second, and third lens units is favorable for a desired correction for aberration.

Additionally, in the finder optical system of the present invention, the first lens unit is fixed, and hence there is no need to provide a glass cover for preventing dust from entering the optical system, with the result that manufacturing costs become low and the longitudinal length of the finder optical system can be further reduced.

This and other objects as well as the features and advantages of the present invention will become apparent from the following detailed description of the preferred embodiments when taken in conjunction with the accompanying drawings.

Referring to the embodiments shown, the present invention will be explained in detail below.

Figures 3A, 3B, 3C:
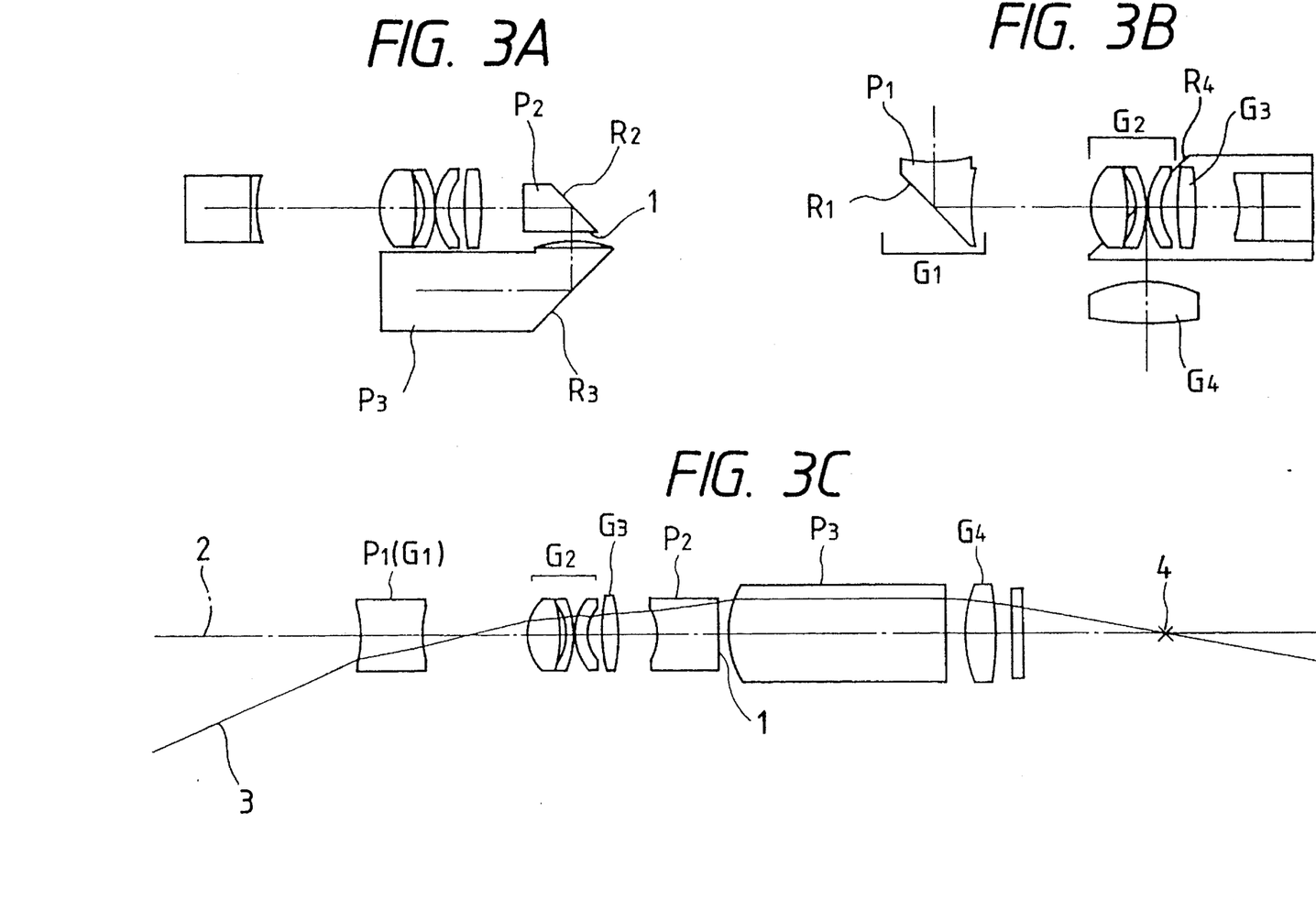
FIG. 3A is a front view showing the arrangement of a first embodiment of the finder optical system according to the present invention.
FIG. 3B is a plan view of the arrangement of the first embodiment.
FIG. 3C is a view showing a distance measured along an optical axis from the foremost end of a first lens unit to the intersection of a principal ray at the maximum field angle with the optical axis.

The optical system of the first embodiment, as shown in FIGS. 3A, 3B, and 3C, is equipped with the reflecting member $P_1$ which is the first lens unit $G_1$ fixed, including a first reflecting surface $R_1$ and composed of a negative lens; the second lens unit $G_2$ which is movable and has a positive refracting power as a whole; the third lens unit $G_3$ which is movable and has a positive refracting power; and the reflecting member $P_2$ having a second reflecting surface $R_2$. These units and members constitute an objective system, which forms an imaging plane 1 (intermediate imaging plane) in agreement with the exit surface of the reflecting member $P_2$. The optical system is further constructed with a reflecting member $P_3$ including a third reflecting surface $R_3$ and a fourth reflecting surface $R_4$, and an eyepiece system $G_4$ composed of an eyepiece, for observing the imaging plane 1 of an objective lens. The reflecting members $P_1$, $P_2$, and $P_3$ constitute an image erecting system. In FIG. 3C, reference numeral 2 represents an optical axis; 3 a principal ray at the maximum field angle; and 4 an eyepoint.

Figure 4A:
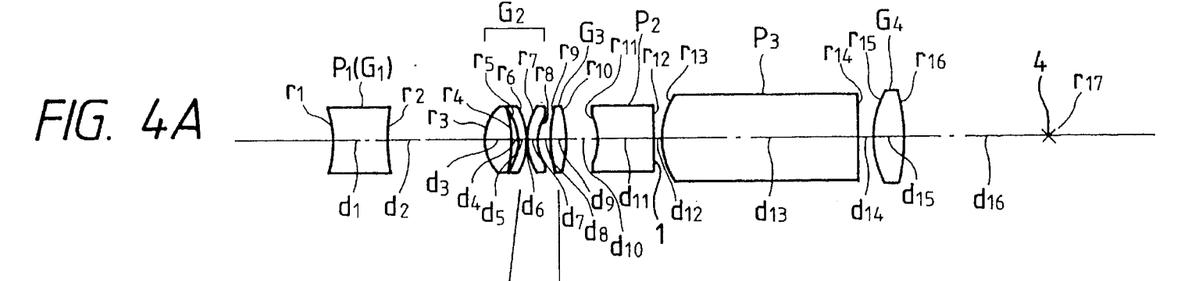
FIGS. 4A, 4B, and 4C are sectional views showing the finder optical system of the first embodiment linearly developed at low, moderate, and high magnification positions, respectively.
Figure 4B:
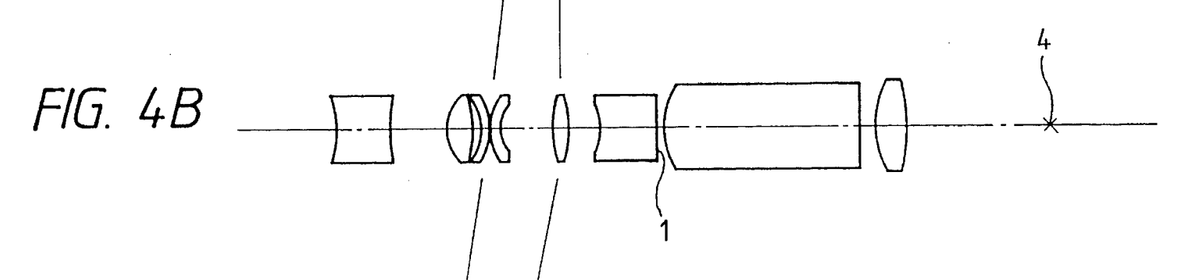
Figure 4C:
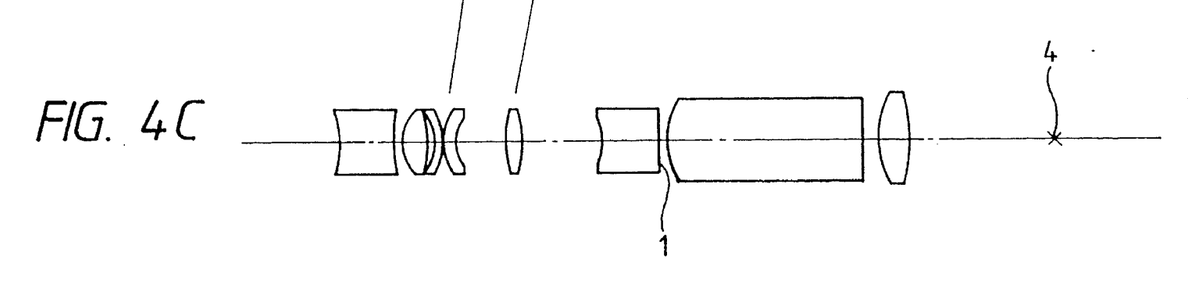
Figure 5A:
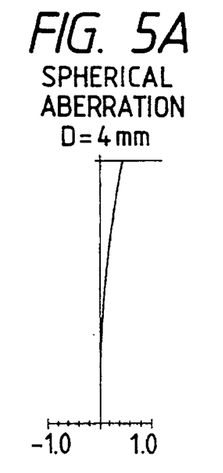
FIGS. 5A, 5B, and 5C are diagrams showing characteristics of spherical aberration, astigmatism, and distortion, respectively, at the low magnification position in the optical system of the first embodiment.
Figure 5B:
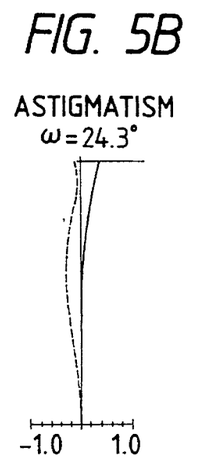
Figure 5C:
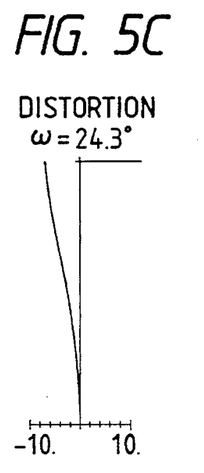
Figure 6A:
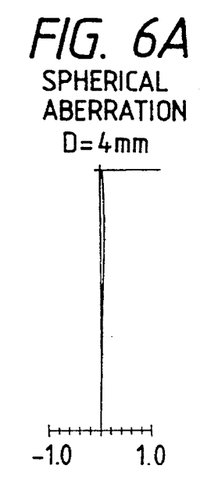
FIGS. 6A, 6B, and 6C are diagrams showing characteristics of spherical aberration, astigmatism, and distortion, respectively, at the moderate magnification position in the optical system of the first embodiment.
Figure 6B:
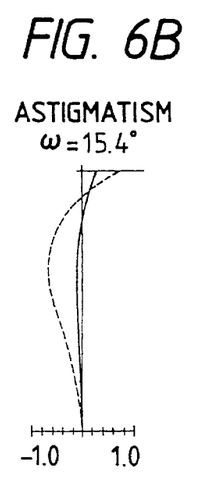
Figure 6C:
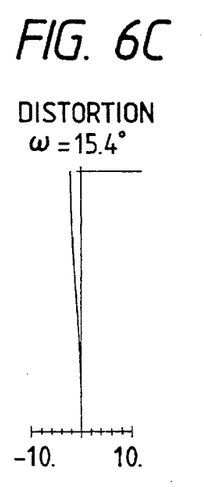
Figure 7A:
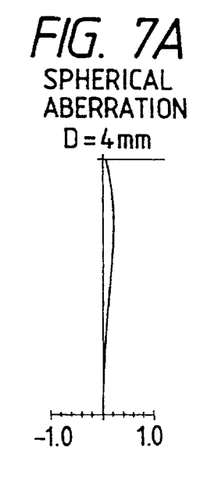
FIGS. 7A, 7B, and 7C are diagrams showing characteristics of spherical aberration, astigmatism, and distortion, respectively, at the high magnification position in the optical system of the first embodiment.
Figure 7B:
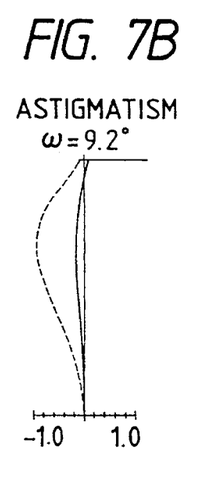
Figure 7C:
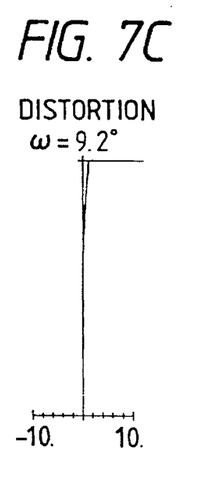
Figure 8A:
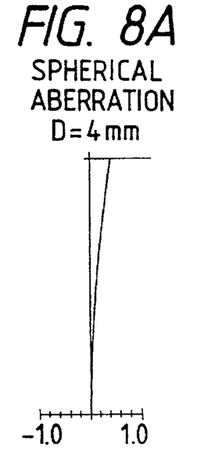
FIGS. 8A, 8B, and 8C are diagrams showing characteristics of spherical aberration, astigmatism, and distortion, respectively, at the low magnification position in the optical system of a second embodiment.
Figure 8B:
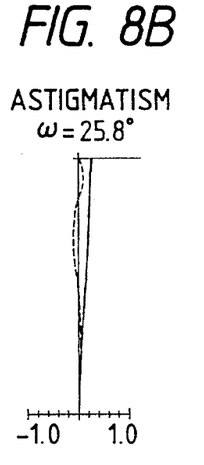
Figure 8C:
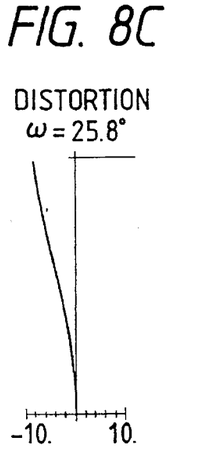
Figure 9A:
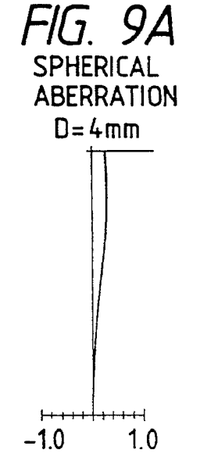
FIGS. 9A, 9B, and 9C are diagrams showing characteristics of spherical aberration, astigmatism, and distortion, respectively, at the moderate magnification position in the optical system of the second embodiment.
Figure 9B:
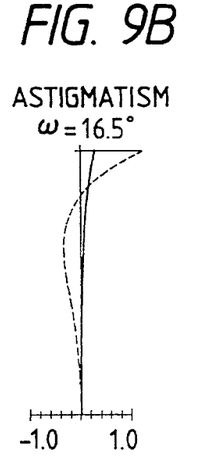
Figure 9C:
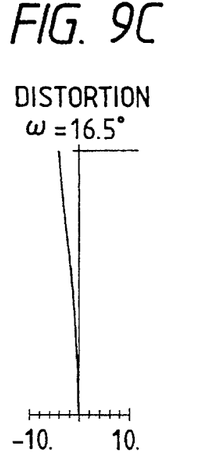
Figure 10A:
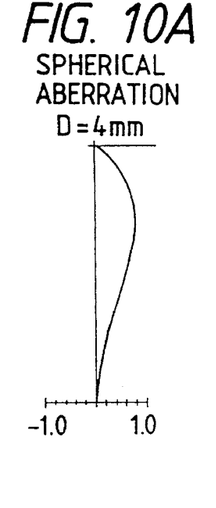
FIGS. 10A, 10B, and 10C are diagrams showing characteristics of spherical aberration, astigmatism, and distortion, respectively, at the high magnification position in the optical system of the second embodiment.
Figure 10B:
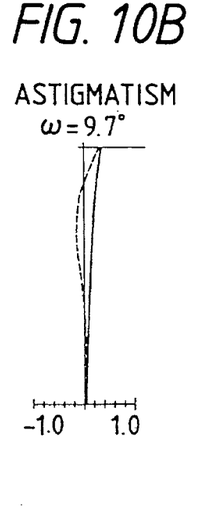
Figure 10C:
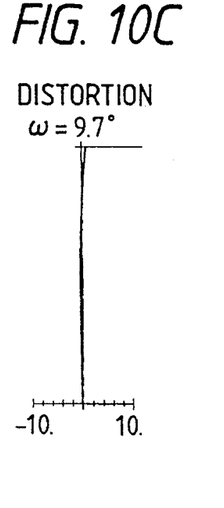
Figure 11A:
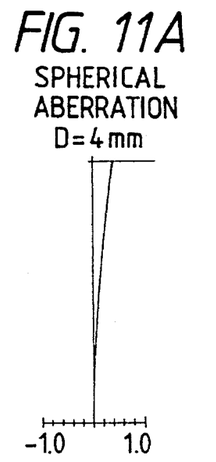
FIGS. 11A, 11B, and 11C are diagrams showing characteristics of spherical aberration, astigmatism, and distortion, respectively, at the low magnification position in the optical system of a third embodiment.
Figure 11B:
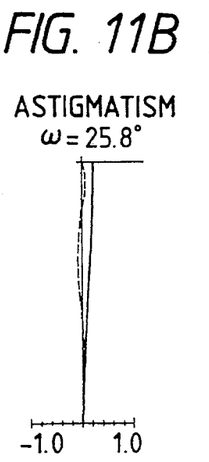
Figure 11C:
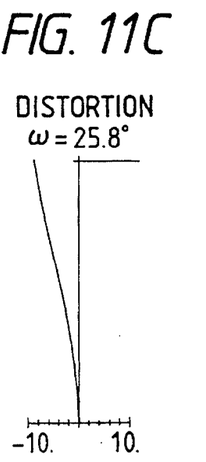
Figure 12A:
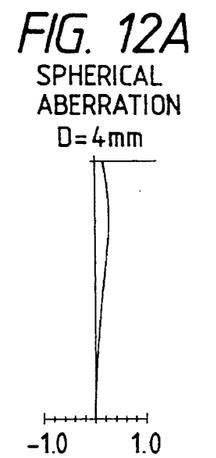
FIGS. 12A, 12B, and 12C are diagrams showing characteristics of spherical aberration, astigmatism, and distortion, respectively, at the moderate magnification position in the optical system of the third embodiment.
Figure 12B:
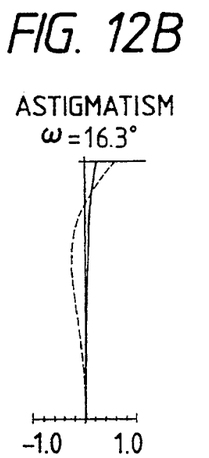
Figure 12C:
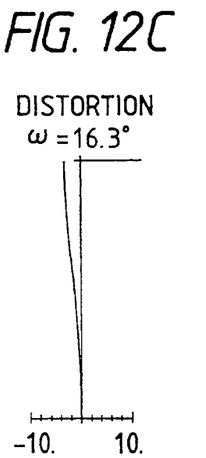
Figure 13A:
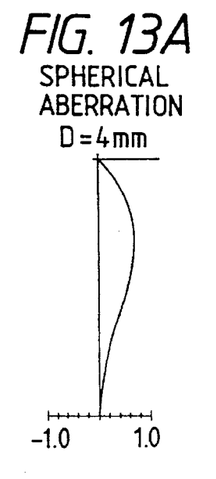
FIGS. 13A, 13B, and 13C are diagrams showing characteristics of spherical aberration, astigmatism, and distortion, respectively, at the high magnification position in the optical system of the third embodiment.
Figure 13B:
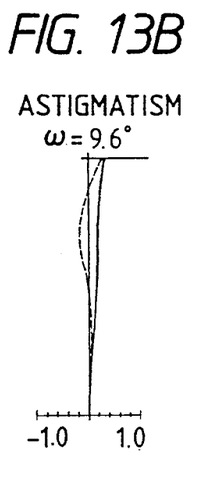
Figure 13C:
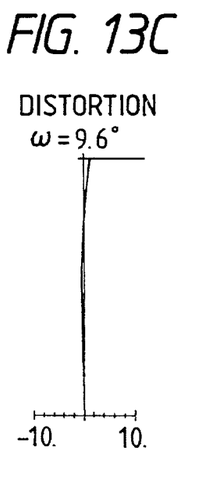

As shown in FIGS. 4A, 4B, and 4C, the second and third lens units $G_2$ and $G_3$ are moved along the optical axis to vary magnification. The characteristics of aberrations of the optical system in the first embodiment are as shown in FIGS. 5A–5C, 6A–6C, and 7A–7C, in which D is a pupil diameter and $\omega$ is a half field angle.

The lens data of the first embodiment are as follows:

| Field angle (2ω) = 48.7~18.4° Finder magnification = 0.45~1.15 | | | |
|---|---|---|---|
| r1 = −14.8762 (aspherical) | | | |
| d1 = 8.000 | n1 = 1.58423 | v1 = 30.49 | |
| r2 = 23.8917 | | | |
| d2 = 13.2841 (low magnification), 7.6084 (moderate magnification), 0.9929 (high magnification) | | | |
| r3 = 6.2885 | | | |
| d3 = 3.818 | n3 = 1.49241 | v3 = 57.66 | |
| r4 = −30.7322 | | | |
| d4 = 1.134 | | | |
| r5 = −7.1360 | | | |
| d5 = 1.000 | n5 = 1.58423 | v5 = 30.49 | |
| r6 = −10.6280 | | | |
| d6 = 0.100 | | | |
| r7 = 6.7918 | | | |
| d7 = 1.554 | n7 = 1.58423 | v7 = 30.49 | |
| r8 = 6.1797 (aspherical) | | | |
| d8 = 1.7987 (low magnification), 7.6717 (moderate magnification), 7.2828 (high magnification) | | | |
| r9 = 28.3087 (aspherical) | | | |
| d9 = 1.981 | n9 = 1.49241 | v9 = 57.66 | |
| r10 = −27.7633 | | | |
| d10 = 4.7846 (low magnification), 4.5563 (moderate magnification), 11.7150 (high magnification) | | | |
| r11 = −10.1338 | | | |
| d11 = 8.000 | n11 = 1.49241 | v11 = 57.66 | |
| r12 = ∞ | | | |
| d12 = 1.000 | | | |
| r13 = 11.5200 | | | |
| d13 = 27.500 | n13 = 1.49241 | v13 = 57.66 | |
| r14 = ∞ | | | |
| d14 = 2.200 | | | |
| r15 = 12.6374 (aspherical) | | | |
| d15 = 4.300 | n15 = 1.49241 | v15 = 57.66 | |
| r16 = −75.2350 | | | |
| d16 = 20.500 | | | |
| r17 (eyepoint) | | | |

Aspherical coefficients

First surface
    $E = 0.64607 \times 10^{-4}$, $F = 0.53885 \times 10^{-5}$,
    $G = -0.54892 \times 10^{-7}$, $H = -0.32008 \times 10^{-8}$
Eighth surface
    $E = 0.10061 \times 10^{-2}$, $F = 0.32571 \times 10^{-4}$,
    $G = 0.25830 \times 10^{-5}$
Ninth surface
    $E = 0.23194 \times 10^{-3}$, $F = -0.39014 \times 10^{-5}$,
    $G = 0.15860 \times 10^{-5}$, $H = -0.53786 \times 10^{-7}$
Fifteenth surface
    $E = -0.12849 \times 10^{-3}$, $F = 0.13471 \times 10^{-5}$,

G = −0.25112 × 10⁻⁷

The values of Eqs. (1) and (2) are as follows:
X/Σd23 = 0.54 (low magnification),
0.52 (moderate magnification),
0.29 (high magnification)
φr1/φG1 = 0.57

Next, reference is made to the second embodiment of the present invention. Since the arrangement of the optical system in this embodiment is the same as that of the first embodiment shown in FIGS. 3A–3C and 4A–4C, its figures are omitted. Also, FIGS. 8A–8C, 9A–9C, and 10A–10C show the characteristics of aberrations of the optical system in the second embodiment.

The lens data of the second embodiment are as follows:

Field angle (2ω) = 51.6–19.4°
Finder magnification = 0.45–1.15 r1 = −14.2534 (aspherical)
    d1 = 9.000          n1 = 1.58423        v1 = 30.49
r2 = 23.8686
    d2 = 12.2810 (low magnification),
         6.6631 (moderate magnification),
         0.5000 (high magnification)
r3 = 7.0814
    d3 = 3.145          n3 = 1.49241        v3 = 57.66
r4 = −10.0894
    d4 = 0.940
r5 = −6.5014
    d5 = 1.000          n5 = 1.58423        v5 = 30.49
r6 = −16.6484
    d6 = 0.100
r7 = 5.1617
    d7 = 2.934          n7 = 1.58423        v7 = 30.49
r8 = 3.7558 (aspherical)
    d8 = 2.7325 (low magnification),
         6.9193 (moderate magnification),
         5.2636 (high magnification)
r9 = 14.2697 (aspherical)
    d9 = 1.770          n9 = 1.49241        v9 = 57.66
r10 = −31.4344
    d10 = 2.6662 (low magnification),
          4.0972 (moderate magnification),
          11.9160 (high magnification)
r11 = −12.7714
    d11 = 8.436         n11 = 1.49241       v11 = 57.66
r12 = ∞
    d12 = 1.000
r13 = 11.5200
    d13 = 27.500        n13 = 1.49241       v13 = 57.66
r14 = ∞
    d14 = 2.200
r15 = 12.6374 (aspherical)
    d15 = 4.300         n15 = 1.49241       v15 = 57.66
r16 = −75.2350
    d16 = 20.000
r17 (eyepoint)

Aspherical coefficients

First surface
    E = 0.67314 × 10⁻⁴, F = −0.46567 × 10⁻⁵,
    G = 0.65291 × 10⁻⁶, H = −0.18516 × 10⁻⁷
Eighth surface
    E = 0.88219 × 10⁻³, F = 0.64747 × 10⁻⁴,
    G = 0.24702 × 10⁻⁵
Ninth surface
    E = 0.56690 × 10⁻³, F = −0.34393 × 10⁻⁴,
    G = 0.39154 × 10⁻⁵, H = −0.11792 × 10⁻⁶
Fifteenth surface
    E = −0.12849 × 10⁻³, F = 0.13471 × 10⁻⁵,
    G = −0.25112 × 10⁻⁷

The values of Eqs. (1) and (2) are as follows:
X/Σd23 = 0.49 (low magnification),
0.69 (moderate magnification),
0.57 (high magnification)
φr1/φG1 = 0.55

Next, reference is made to the third embodiment of the present invention. Since the arrangement of the optical system in this embodiment is the same as that of the first embodiment shown in FIGS. 3A–3C and 4A–4C, its figures are omitted. Also, FIGS. 11A–11C, 12A–12C, and 13A–13C show the characteristics of aberrations of the optical system in the third embodiment.

The lens data of the third embodiment are as follows:

Field angle (2ω) = 51.6–19.2°
Finder magnification = 0.45–1.15 r1 = −14.2967 (aspherical)
    d1 = 8.000          n1 = 1.58423        v1 = 30.49
r2 = 22.2283
    d2 = 12.7332 (low magnification),
         6.9287 (moderate magnification),
         0.5000 (high magnification)
r3 = 7.7249
    d3 = 3.216          n3 = 1.49241        v3 = 57.66
r4 = −8.6435
    d4 = 0.880
r5 = −6.1607
    d5 = 1.000          n5 = 1.58423        v5 = 30.49
r6 = −16.0838
    d6 = 0.100
r7 = 5.2593
    d7 = 3.102          n7 = 1.58423        v7 = 30.49
r8 = 3.8116 (aspherical)
    d8 = 2.8485 (low magnification),
         6.9946 (moderate magnification),
         5.2630 (high magnification)
r9 = 15.8483 (aspherical)
    d9 = 2.009          n9 = 1.49241        v9 = 57.66
r10 = −19.3008
    d10 = 2.6819 (low magnification),
          4.3402 (moderate magnification),
          12.1405 (high magnification)
r11 = −10.5653
    d11 = 8.436         n11 = 1.49241       v11 = 57.66
r12 = ∞
    d12 = 1.000
r13 = 11.5200
    d13 = 27.500        n13 = 1.49241       v13 = 57.66
r14 = ∞
    d14 = 2.200
r15 = 12.6374 (aspherical)
    d15 = 4.300         n15 = 1.49241       v15 = 57.66
r16 = −75.2350
    d16 = 20.000
r17 (eyepoint)

Aspherical coefficients

First surface
    E = 0.68796 × 10⁻⁴, F = −0.14907 × 10⁻⁵,
    G = 0.23235 × 10⁻⁶, H = −0.55736 × 10⁻⁸
Eighth surface
    E = 0.58138 × 10⁻³, F = 0.57345 × 10⁻⁴,
    G = −0.12884 × 10⁻⁵
Ninth surface
    E = 0.46162 × 10⁻³, F = −0.22894 × 10⁻⁴,
    G = 0.23641 × 10⁻⁵, H = −0.68304 × 10⁻⁷
Fifteenth surface
    E = −0.12849 × 10⁻³, F = 0.13471 × 10⁻⁵,
    G = −0.25112 × 10⁻⁷

The values of Eqs. (1) and (2) are as follows:
X/Σd23 = 0.50 (low magnification),
0.60 (moderate magnification),
0.48 (high magnification)
φr1/φG1 = 0.56

In each embodiment mentioned above, $r_1, r_2, \ldots$ represent radii of curvature of individual lens surfaces; $d_1, d_2, \ldots$ thicknesses of individual lenses or spaces therebetween; $n_1, n_3, \ldots$ refractive indices of individual lenses; and $v_1, v_3, \ldots$ Abbe's numbers of individual lenses.

Also, the configurations of aspherical surfaces in each embodiment are expressed by the following equation using the aspherical coefficients:

$$X = \frac{CS^2}{1 + \sqrt{1 - PC^2S^2}} + ES^4 + FS^6 + GS^8 + HS^{10}$$

where X represents the coordinates in the direction of the optical axis, S the coordinates in the direction normal to the optical axis, C the paraxial curvature at the vertex of the aspherical surface, P the conic constant, and E, F, G, and H the aspherical coefficients of fourth, sixth, eighth, and tenth orders.

What is claimed is:

1. A real image mode variable magnification finder optical system comprising, in order from an object side:
    a finder objective having a positive refracting power as a whole and being provided separate from a photographic objective, said finder objective including:
        a first lens unit having a negative refracting power,
        a second lens unit movable along an optical axis for varying magnification, having a positive refracting power, and
        a third lens unit movable along said optical axis for varying magnification, having a positive refracting power;
    an eyepiece for observing an image formed by said finder objective, said eyepiece having a positive refracting power as a whole;
    a first reflecting surface disposed on an incidence side of a region of space provided on an object side of said second lens unit for movement of lenses in varying a magnification of said real image mode variable magnification finder optical system;
    a second reflecting surface disposed between said third lens unit and an intermediate imaging plane; and
    a third reflecting surface and a fourth reflecting surface disposed between said second reflecting surface and said eyepiece;
    said first reflecting surface, said second reflecting surface, said third reflecting surface, and said fourth reflecting surface for erecting said image.

2. A real image mode variable magnification finder optical system according to claim 1, wherein:
    said first reflecting surface is disposed between an entrance surface and an exit surface of said first lens unit.

3. A real image mode variable magnification finder optical system according to claim 1, satisfying a condition:

$0.2 < X/\Sigma d_{23} < 0.8$ where X is a distance measured along an optical axis from a foremost end of said first lens unit to an intersection of a principal ray at a maximum field angle with said optical axis, and $\Sigma d_{23}$ is a length measured along said optical axis from said foremost end of said first lens unit to a rearmost end of said second lens unit.

4. A real image mode variable magnification finder optical system according to claim 1, satisfying a condition:

$0.1 < \phi_{r1}/\phi_{G1} < 0.7$ where $\phi_{r1}$ is a refracting power on an entrance side of said first reflecting surface and $\phi_{G1}$ is a refracting power of said first lens unit.

5. A real image mode variable magnification finder optical system according to claim 1, wherein:
    said first lens unit is fixed when a change of magnification is made.

6. A real image mode variable magnification finder optical system comprising, in order from an object side:
    a finder objective having a positive refracting power as a whole and being provided separate from a photographic objective, said finder objective including, in order from an object side:
        a first lens unit having a negative refracting power,
        a second lens unit having a positive refracting power, and
        a third lens unit having a positive refracting power,
        said second lens unit and said third lens unit being movable along an optical axis to thereby vary a magnification of said real image mode variable magnification finder optical system;
    an eyepiece having a positive refracting power;
    a first reflecting surface disposed on an object side of said second lens unit; and
    a second reflecting surface, a third reflecting surface, and a fourth reflecting surface disposed between said first reflecting surface and said eyepiece, said second reflecting surface being disposed between said third lens unit and an intermediate imaging plane formed by said finder objective;
    said first reflecting surface, said second reflecting surface, said third reflecting surface and said fourth reflecting surface erecting an image.

7. A real image mode variable magnification finder optical system comprising, in order from an object side:
    a finder objective having a positive refracting power as a whole and being provided separate from a photographic objective, said finder objective including, in order from an object side:
        a first lens unit having a negative refracting power,
        a second lens unit having a positive refracting power, and
        a third lens unit having a positive refracting power,
        said second lens unit and said third lens unit being movable along an optical axis to thereby vary a magnification of said real image mode variable magnification finder optical system;
    an eyepiece having a positive refracting power;
    a first reflecting surface disposed on an object side of said second lens unit, said first reflecting surface being disposed between an entrance surface and an exit surface of said first lens unit; and
    a second reflecting surface, a third reflecting surface, and a fourth reflecting surface disposed between said first reflecting surface and said eyepiece;
    said first reflecting surface, said second reflecting surface, said third reflecting surface and said fourth reflecting surface erecting an image.

8. A real image mode variable magnification finder optical system comprising, in order from an object side:
    a finder objective having a positive refracting power as a whole and being provided separate from a photographic objective, said finder objective including, in order from an object side:
        a first lens unit having a negative refracting power, a second lens unit having a positive refracting power, and a third lens unit having a positive refracting power, said second lens unit and said third lens unit being movable along an optical axis to thereby vary a magnification of said real image mode variable magnification finder optical system;

an eyepiece having a positive refracting power;

a first reflecting surface disposed on an object side of said second lens unit; and a second reflecting surface, a third reflecting surface, and a fourth reflecting surface disposed between said first reflecting surface and said eyepiece;

said first reflecting surface, said second reflecting surface, said third reflecting surface and said fourth reflecting surface erecting an image; and said real image mode variable magnification finder optical system satisfying a condition:

$$0.2 < X/\Sigma d_{23} < 0.8$$

where X is a distance measured along an optical axis from a foremost end of said first lens unit to an intersection of a principal ray at a maximum field angle with said optical axis, and $\Sigma d_{23}$ is a length measured along said optical axis from said foremost end of said first lens unit to a rearmost end of said second lens unit.

9. A real image mode variable magnification finder optical system comprising, in order from an object side:

a finder objective having a positive refracting power as a whole and being provided separate from a photographic objective, said finder objective including, in order from an object side:

a first lens unit having a negative refracting power, a second lens unit having a positive refracting power, and a third lens unit having a positive refracting power, said second lens unit and said third lens unit being movable along an optical axis to thereby vary a magnification of said real image mode variable magnification finder optical system;

an eyepiece having a positive refracting power;

a first reflecting surface disposed on an object side of said second lens unit; and a second reflecting surface, a third reflecting surface, and a fourth reflecting surface disposed between said first reflecting surface and said eyepiece;

said first reflecting surface, said second reflecting surface, said third reflecting surface and said fourth reflecting surface erecting an image; and said real image mode variable magnification finder optical system satisfying a condition:

$$0.1 < \phi_{r1}/\phi_{G1} < 0.7$$

where $\phi_{r1}$ is a refracting power on an entrance side of said first reflecting surface and $\phi_{G1}$ is a refracting power of said first lens unit.

* * * * *